May 20, 1969   R. J. SCHOERNER ET AL   3,444,684

METHOD OF FORMING A MULTI-STRAND CABLE

Original Filed Jan. 1, 1967

INVENTORS
ROGER J. SCHOERNER
BOBBY A. ROWLAND
BY

ATTORNEYS

United States Patent Office 3,444,684
Patented May 20, 1969

3,444,684
METHOD OF FORMING A MULTI-STRAND CABLE
Roger J. Schoerner and Bobby A. Rowland, Carrollton, Ga., assignors to Southwire Company, Carrollton, Ga., a corporation of Georgia
Original application Jan. 1, 1967, Ser. No. 608,306, now Patent No. 3,383,704, dated May 14, 1968. Divided and this application Apr. 10, 1968, Ser. No. 720,308
Int. Cl. D07b 1/06; D02g 3/36
U.S. Cl. 57—161                10 Claims

ABSTRACT OF THE DISCLOSURE

What is disclosed herein is a method of forming of a multi-strand cable involving winding a plurality of layer strands about at least one inner strand, and subsequently or simultaneously deforming each of the layer strands by an amount which is sufficient to form a flattened region along the length of the layer strand while leaving the layer strand substantially circular in cross-section. The resulting multi-strand cable has the advantages without the disadvantages of a conventional compact cable and a conventional uncompacted cable.

*Cross-reference to related application*

This application is a division of co-pending U.S. patent application, Serial No. 608,306, filed on January 1, 1967, and now Patent No. 3,383,704, by Roger J. Schoerner and Bobby A. Rowland for a "Multi-Strand Cable."

*Background of the invention*

(1) *Field of the invention.*—The present invention relates to multi-strand cable. More particularly, the present invention relates to a method of forming a multi-strand electrical cable so as to provide a cable wherein imprinting of the insulating cover and any tendency to spiral have been substantially eliminated while retaining good overall physical properties including flexibility.

(2) *Description of the prior art.*—The usual method presently employed to form multi-strand electrical cable involves helically stranding a plurality of individual wire strands about a central core strand in one or more layers without deformation of any of the strands. This type of cable is generally referred to as conventional uncompacted cable. The resulting cross-section of the cable comprises a core strand surrounded by one or more concentric arrays of individual strands wherein each strand including the core strand is of circular cross-sectional configuration. After stranding the cable is normally covered with a suitable insulating material such as neoprene or a polyolefin by an extrusion-coating process.

Several problems exist with cable formed in this manner. First, since no effort is made to reduce the cable diameter a maximum amount of insulating material is necessary to provide a cover for the cable. This amount of insulating material is further increased due to the superficial valleys on the cable which are created by the individual strands of circular cross-section forming the outermost concentric array. Second, the stranding operation does not form a particularly tight-stranded cable. As a result the extrusion-coating process which operates at relatively high pressures, forces insulating material into the internal interstices between the individual strands of the cable thereby causing what is commonly referred to as "imprinting" in the resultant insulating cover. Third, relatively long lengths of the cable have a pronounced tendency to assume an elongated spiral configuration. This spiralling in the cable is caused by kinks in the core strand or in one or more of the layer strands. It is also caused by unequal tension placed on the individual strands as a result of the stranding operation.

In an effort to overcome these problems it has previously been proposed to highly compress the stranded cable to the extent that the internal interstices are eliminated and the valleys are reduced to a minimum in size. This has been accomplished by passing the cable immediately after being stranded through a high compression die. The resulting cross-section of the cable comprises the usual core strand surrounded by one or more concentric arrays of individual strands; however, each strand including the core strand has been deformed to the extent that its original cross-section has been altered to resemble a polygonal configuration. All of these deformed strands nest together to form a substantially continuous cross-sectional surface wherein only lines of juncture between the individual strands remain in place of the interstices. From a practical view, there is a limit on the size of cables which may be compressed in this manner since high pressures are required for the compressing operation and it becomes increasingly difficult to achieve the necessary pressures as the diameter of the cable is increased.

Stranded cable which has been compressed in this manner is generally referred to as "compact" cable. Because of the compactness of the cable the extruded insulating cover does not suffer from imprinting and also less insulating material is necessary to completely cover the cable due to its reduced diameter. Moreover, the compressive forces required to produce compact cable essentially remove any kinks which may be in the individual strands and substantially equalize the tension forces among the strands thus eliminating the spiralling characteristic which is present in the completely uncompacted cable.

There do exist some serious drawbacks in forming compact cable. First, the required compression forces are so high that the stranded cable is subject to frequent breakage as it is drawn through the compression die, particularly with cables of relatively large diameters. Second, a very large drawing force is required thus increasing power consumption. Third, and probably most important, the metal strands become cold worked as they pass through the compression die and consequently their physical properties are altered. By far the most important effect on physical properties is the loss in flexibility and elongation when considering that the product comprises electrical cable.

*Summary of the invention*

Therefore, in accordance with the present method of the invention there is provided a multi-strand electrical cable which does not suffer from the spiralling characteristics nor imprinting of the insulating cover as are present in the conventional uncompacted cable yet substantially has the desirable physical properties such as flexibility and elongation which are not present in compact cable.

Briefly described, the method disclosed herein provides a stranded electrical cable which in its most simple construction is formed by helically stranding a plurality of individual wire strands about a central core strand in a concentric array forming a single layer. Thereafter, the stranded product is passed through a sizing die to substantially deform or flatten only the outermost surface of the single-layered cable. This degree of deformation has been found to be sufficient to substantially eliminate the internal stresses set up within the strands during the stranding operation which cause spiralling. The resulting cable comprises a core strand, having a substantially circular cross-sectional configuration, surrounded by a single concentric array of helically wound individual strands whose surface portions corresponding to and forming the outermost surface of the cable have been flattened. The remaining surface portions of the individual strands retain their smoothly curved configurations.

Thus, another readily apparent feature of the cable formed by the method of the present invention as compared to the conventional uncompacted cable is that less insulating material is required due to the reduction in size of the valleys on the surface of the cable and a reduced effective diameter of the cable. In addition, as compared to the formation of compact cable, the formation of the cable by the present invention requires much less compression and drawing force thereby significantly decreasing potential breakage of the stranded cable as it passes through the sizing die. Of course, larger diameter cables are also capable of being formed in accordance with the present invention as a result of the lower forces required.

*Brief description of the drawing*

These and other features and objects of the present invention will become more apparent from the following discussion and the accompanying drawing wherein.

*Description of an embodiment*

Figure 1:
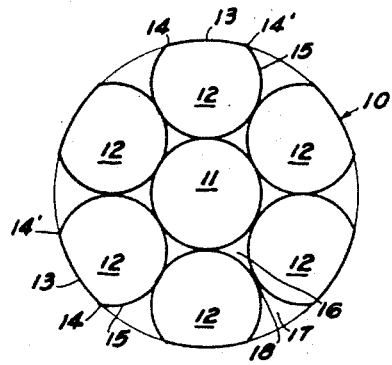
FIGURE 1 is a cross-sectional view of the stranded electrical cable formed by the present invention in its most simple construction.

With reference to FIGURE 1, there is shown a multi-strand electrical cable, generally designated by numeral 10, which includes a core strand 11 surrounded by a single concentric layer of helically wound strands 12 of which are in tight surface contact with the core strand. The core strand 11 is substantially circular in cross-section while strands 12, originally of circular cross-section, have been deformed in those regions 13 of their surfaces which correspond to and form the outer surface of the cable. While this deformation may be somewhat exaggerated in the drawings, fairly perceptible corners 14 and 14' bounding each side of the deformed regions 13 are present. The remaining surface regions 15 of the strands 12 substantially retain their original roundness. That is, the surface region 15 of each strand 12 essentially defines a continuous curve extending from corner 14 to corner 14' with no intermittent flattened areas.

Due to the cross-sectional configurations of the strands, interstices 16 are formed on the interior of the cable between strands 12 and core strand 11 while superficial valleys 17 are formed on the exterior of the cable between the strands 12. The interstices 16 are sealed from valleys 17 by the tight contact 18 between adjacent strands 12. This contact seal is sufficient to effectively prevent coating materials from entering the interstices during an extrusion coating operation which may be subsequently performed on the cable. Thus, as pointed out previously, "imprinting" in the insulating cover of the cable is eliminated.

In addition, it is pointed out that the deformed regions 13 of the cable produce a corresponding decrease in the depth of the valleys 17 and in the effective diameter of the cable. Therefore, less coating material is required to fill the valleys and cover the cable to provide an insulating sheath.

As previously described, the strands 12 are in tight engagement with each other as well as with core strand 11. These strands are also under substantially equal tension and possess no kinks, all of which directly results from the manner in which the cable is formed to produce the deformed regions 13 on strands 12. The cable, as a result, may be unrolled from its carrier spool and lie in a substantially straight-line path exhibiting no tendency to spiral.

Figure 2:
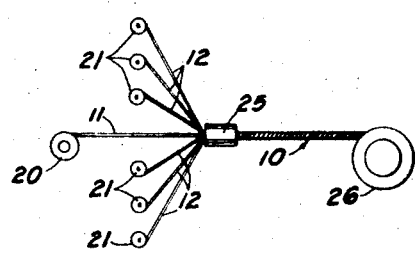
FIGURE 2 is a schematic view illustrating that embodiment of the invention by which the cable shown in FIGURE 1 is formed.

Formation of the above-described multi-strand cable by method disclosed herein may be accomplished using a conventional stranding machine in combination with an appropriate sizing die, all of which is schematically represented in FIGURE 2. This apparatus includes a spool 20 from which the core strand 11 is supplied. The core strand is fed axially into the entrance end of the sizing die 25. Surrounding the core strand as it passes to the die is a concentric array of supply spools 21 containing strands 12. These supply spools are mounted on a rotatable frame (not shown) of a conventional stranding machine, such as those shown and described in U.S. Patent No. 1,691,337 and U.S. Patent No. 2,156,652, among others. While the frame rotates the strands 12 are fed to the sizing die concurrently with the core strand 11 whereupon they become helically wound about the core strand 11. The helically wound structure is then drawn through the die thereby forcing the strands 12 into tight arrangement around the core strand while their outermost surfaces are deformed to form regions 13 as shown and described with reference to FIGURE 1. A suitable lubricant, such as a mineral oil, may be used during the drawing operation to reduce the drawing force necessary and the resulting multi-strand electrical cable 10 is thereafter withdrawn from the die 25 and wound upon a suitable spool 26 for subsequent treatment such as an extrusion coating process.

The sizing die merely defines a sizing aperture for the strands 12 and core strand 11. It may be formed by a plurality of rolls arranged so that their axes approximate a circle in much the same manner as some rolling mills. However, it is preferred that the sizing die comprise a block of hard metallic material such as tungsten carbide having the sizing aperture extending therethrough while gradually tapering along its relatively long length.

In deforming the surfaces of strands 12 within the sizing die 25 the strands actually become cold-worked to a limited degree. The amount of cold-working which takes place is limited to cause removal of kinks and equalization of tension among the strands and does not have any significant effect on the physical properties of the strands. The removal of kinks and the equalization of tension among the strands is quite significant in the final multistrand electrical cable in that the cable has no tendency to spiral as is characteristic of conventional stranded cables.

While the multi-strand electrical cable is formed by sizing the cable at the point of stranding in FIGURE 2 it should be understood that the stranding operation may take place separately in advance of the sizing operation.

As previously pointed out, multi-strand electrical cable having a greater number of individuad strands than the cable of FIGURE 1 may also be formed in accordance with the present concepts. Briefly, these larger size multi-strand cables may be formed by stranding and sizing successive layers of strands about a central core strand in much the same manner as illustrated in FIGURE 2. As a result, the strands of each layer are deformed in those surface regions forming the outer periphery of the same layer, and are forced into tight arrangement about the inner portion of the cable structure which is surrounded by the layer.

Figure 3:
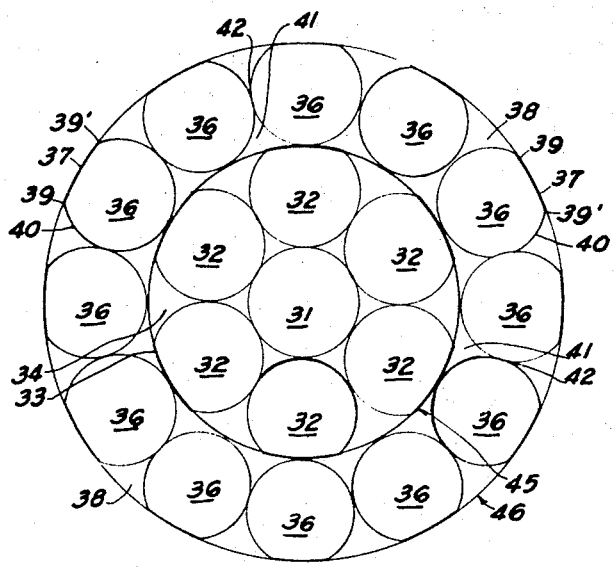
FIGURE 3 is a cross-sectional view of a second stranded electrical cable formed by the method of the present invention wherein two concentric arrays of individual strands are provided around a central core strand.

This will be better understood with reference to FIGURE 3 wherein a two-layered multi-strand electrical cable formed by the method disclosed herein is illustrated. Specifically, the cable includes an inner cable structure comprising a core strand 31 surrounded by a single layer of helically wound strands 32. The strands 32 are in tight engagement with the core strand 31. This inner cable structure has been sized to produce flattened regions 33 on strands 32 which form the outer periphery of the inner cable structure along with the valleys 34 between the strands. As is apparent, the inner cable structure is identical with the structure of the single-layered cable described with respect to FIGURE 1.

Surrounding the inner cable structure is a second layer of strands 36 which are helically wound in a direction opposite to the strands 32. The strands 36 are similarly flattened in regions 37 forming the outer periphery of the cable along with the valleys 38 between the strands. Each flattened region 37 is bounded by corners 39 and 39' while the remaining surface region 40 substantially retains its roundness or continuous curvature. Internal interstices 41, which periodically cross over the valleys 34 of the inner cable structure, are effectively sealed from the valleys 38 by the tightness of the contact a t42 between adjacent strands 36. In addition, the strands 36 are in tight contact with the flattened regions 33 of the strands 32.

Figure 4:
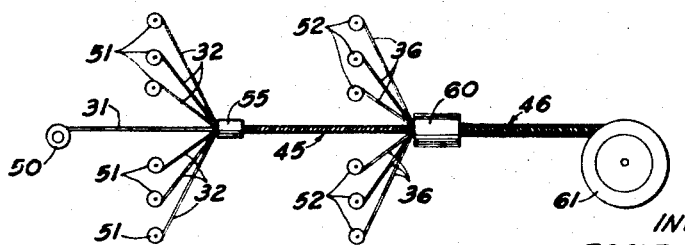
FIGURE 4 is a schematic view illustrating that embodiment of the method by which the cable shown in FIGURE 3 is formed.

Formation of the above-described two layer multi-strand electrical cable, as well as cables of more than two layers, essentially involves duplication of the steps involved in forming a single layer cable. Thus, for example, in FIGURE 4 there is shown the core strand 31 being axially fed from a supply spool 50 to a first sizing die 55. The strands 32 forming the first layer of the cable are simultaneously fed to the die from spools 51 mounted on a rotating frame (not shown) of a conventional stranding machine. The inner cable structure 45 is thereafter withdrawn from the sizing die 55 and axially fed to a second sizing die 60. Strands 36 are also fed to the die from spools 52 in the same manner as strands 32 are fed to die 55, with the exception that the frame is rotating in the opposite direction. The resulting two-layer multi-strand electrical cable 46 are described with respect to FIGURE 3 is withdrawn from the die 60 and wound upon a spool 61.

In this embodiment of the method if should be understood that both layers of strands are cold-worked in their flattened regions to a limited degree by the dies 55 and 60. The cold-working is limited to removal of kinks in the strands and the equalization of the tension among the strands within each layer. This essentially reduces the internal stresses built up within the strands during the stranding operation. The physical properties, such as flexibility and elongation, remain substantially unaffected.

Thus, in accordance with concepts disclosed above, a multi-strand electrical cable, having one or more layers of strands, may be conveniently constructed to possess the major advantageous features now possessed individually by conventional cable and compact cable without suffering from the corresponding disadvantageous features.

The following examples will serve to additionally point out certain aspects of the invention.

*Example 1*

Six individual aluminum strands were stranded about an aluminum core strand and the stranded structure was passed through a sizing die. The diameter of each strand, including the core strand, was approximately 24.3 mils and the minimum diameter of the sizing aperture of the die was about 71 mils.

The resulting multi-strand electrical cable had a maximum diameter of about 72 mils. The cable exhibited good properties of flexibility and elongation and had no tendency to spiral when laid out along a path without being anchored.

*Example 2*

A cable was formed as described in Example 1 and, in addition, an insulating sheath was extruded thereover. There was no evidence of imprinting in the sheath.

*Example 3*

An AWG No. 1 copper cable was formed in accordance with the following specifications. Six individual copper strands were stranded about a copper core strand. Each of the strands was approximately 111.5 mils in diameter. The stranded structure was then passed through a sizing die having an aperture of 318 mils minimum diameter.

The resulting multi-strand electrical cable had a maximum diameter of 319 mils and exhibited good properties of flexibility and elongation. No tendency to spiral was present.

*Example 4*

A double-layer AWG No. 10 aluminum cable was formed in accordance with the following specifications. Six individual aluminum strands were stranded about an aluminum core strand, each of the strands being approximately 23.5 mils in diameter. The stranded structure was passed through a sizing die having an aperture of about 68 mils minimum diameter. The resulting single-layer cable had a maximum diameter of about 69 mils. Twelve individual aluminum strands, each of about 23.5 mils in diameter, were then stranded about the single layer cable and passed through a second sizing die having an aperture of about 113 mils minimum diameter.

The resulting muti-strand electrical cable had a maximum diameter of about 114 mils and exhibited good properties of flexibility and elongation. The cable had substantially no tendency to spiral when laid out in an unanchored position.

*Example 5*

A double-layer AWG No. 2 copper cable was formed in accordance with the following specifications. Six copper strands were stranded about a copper core strand and passed through a sizing die having an aperture of about 172 mils minimum diameter. Each of the strands was initially about 60.3 mils in diameter. The resulting single-layer cable, having a maximum diameter of about 173 mils, was stranded with twelve additional copper strands, each of about 60.3 mils in diameter. The stranded structure was passed through a second sizing die having an aperture of 287 mils minimum diameter.

The resulting multi-strand electrical cable had a maximum diameter of about 288 mils and was covered with an insulating sheath by extrusion. The cable possessed good properties of flexibility and elongation. No tendency to spiral was exhibited and no imprinting in the insulating sheath was found.

*Example 6*

A three-layer AWG No. 300 copper cable was formed in accordance with the following specifications. Six copper strands were stranded about a copper core strand, each of the strands being approximately 91.8 mils in diameter. The stranded structure was then passed through a sizing die having an aperture of 262 mils minimum diameter. The resulting single-layer cable, having a maximum diameter of about 263 mils, was then stranded with twelve additional strands, each being about 91.8 mils in diameter. The stranded structure was drawn through a second sizing die having an aperture of about 437 mils minimum diameter and the resulting double-layer cable had a maximum diameter of about 438 mils. The double-layer cable was then stranded with an additional eighteen strands, each of about 83.3 mils in diameter. The thus stranded structure was drawn through a third sizing die having an aperture of about 611 mils minimum diameter and a three-layer cable of about 614 mils in diameter was produced.

The three-layer multi-strand cable was covered with an insulating sheath by the usual extrusion coating process. The sheath showed no signs of imprinting. The cable, in general, exhibited good properties of flexibility and elongation and had no tendency to spiral.

Additional tests were performed on cable having strands of different diameters than those listed above as well as four-layer cables. The results obtained in all instances were in agreement with those obtained in Examples 1–6.

From the above detailed description it will be readily apparent to those skilled in the art that multi-strand cables of any numbers of layers of strands may be made in accordance with the method of the invention. It is further pointed out that while only copper and aluminum strands have been mentioned in connection with the examples, strands of other metals may be employed, such as bronze, silver, brass, steel, gold, magnesium, nickel, tungsten, zinc and alloys of the same.

Moreover, from Examples 1–6 and the foregoing general description of cables formed in accordance with the invention, it will now be understood that a multi-strand cable formed by the invention disclosed herein is characterized by a relatively flattened region 13, 33, or 37 which extends along the length of each layer strand 12, 32 or 36 and which is positioned in the perimeter of the layer strand 12, 32 or 36 so that it defines that portion of the perimeter which is most remote from a core strand 11 or 31. It will also be understood that the width of a region 13, 33 or 37 is limited so that the cross-section of a layer strand 12, 32 or 36 remains substantially circular. This limiting of the width of a region 13, 33 or 37 serves to provide substantial wedge-shaped valleys 17, 34, and 37 between adjacent layer strands 12, 32 or 36 and to otherwise provide a cable which does not have the undesirable physical properties which are characteristic of a prior art compact cable. However, even a region 13, 33 or 37 which is limited in width provides a cable which does not have the undesirable properties of a prior art uncompacted cable.

In connection with the width of a region, 13, 33 or 37, it will be noted from FIGS. 1 and 3 that the portion of the perimeter of a layer strand 12, 32 or 36 which is defined by a region 13, 33 or 37 is approximately twenty-one percent of the perimeter. When the Examples 1–6 are manufactured and examined, it will be found that the portion of the perimeter of a layer strand 12, 32 or 36 which is defined by a region 13, 33 or 37 is also approximately twenty-one percent or less.

Thus, from a production standpoint, it will be understood that a multi-strand cable formed by the embodiments of the invention disclosed herein is a cable which has a region 13, 33 or 37 along each layer strand 12, 32, or 36 so as to avoid the undesirable characteristics of a conventional uncompacted cable but in which region 13, 33 or 37 is limited to a width that defines less than twenty-two percent of the perimeter of a layer strand 12, 32, or 36 so as to avoid the undesirable characteristics of a conventional compact cable.

We claim:

1. A method of forming a multi-strand cable comprising the steps of stranding a first layer of strands about a core strand and deforming each of the first layer strands to flatten portions of their outwardly facing peripheral surfaces along their entire length while substantially retaining the rounded configurations of the entire remaining peripheral surfaces of the strands.

2. A method according to claim 1 including successively stranding at least one additional layer of strands about the first layer of deformed strands and successively deforming each of the strands of the layer to flatten portions of their outwardly facing peripheral surfaces along their entire length while substantially retaining the rounded configurations of the entire remaining peripheral surfaces of the strands.

3. A method according to claim 1 including applying an insulating sheath over the stranded structure.

4. In a method of forming a multi-strand cable having a plurality of strands wound about at least one strand, the step of deforming said plurality of strands by a force which is sufficient to deform said plurality of strands but which is not sufficient to cause substantial deforming of said at least one strand.

5. The method of claim 4 in which each of said plurality of strands has a substantially circular cross-section prior to said deforming and in which said force is restricted to that force that flattens only a portion of said circular cross-section.

6. The method of claim 5 in which said cross-section defines a perimeter and in which said portion has a length in said perimeter which is less than twenty-two percent of said perimeter.

7. The method of claim 4 including the step of winding said plurality of strands about said at least one strand prior to said deforming said plurality of strands.

8. The method of claim 4 including the step of winding said plurality of strands about said at least one strand substantially simultaneously with said deforming said plurality of strands.

9. The method of claim 4 in which said at least one strand is a core strand and in which said plurality of strands is wound about said core strand and a second plurality of strands and including the step of deforming said second plurality strands prior to said step of deforming said strands.

10. In a method of forming a multi-strand cable having a layer of strands which are substantially circular in cross-section, the step of deforming a strand to form a single flattened region along its length while said strand is in said layer.

References Cited

UNITED STATES PATENTS

| 1,888,076 | 11/1932 | Evans | 57—161 XR |
| 2,071,709 | 2/1937 | Riddle | 57—166 |
| 2,156,652 | 5/1939 | Harris | 57—162 |
| 3,083,817 | 4/1963 | Campbell | 57—161 |
| 3,130,536 | 4/1964 | Peterson et al. | 57—161 |
| 3,234,722 | 2/1966 | Gilmore | 57—161 XR |
| 3,295,310 | 1/1967 | Beighley | 57—145 |

FOREIGN PATENTS 330,916 8/1903 France.

DONALD E. WATKINS, *Primary Examiner.*

U.S. Cl. X.R.

57—162